Oct. 23, 1928.
R. POHL ET AL
1,689,188
DYNAMO ELECTRIC MACHINE
Filed March 29, 1927
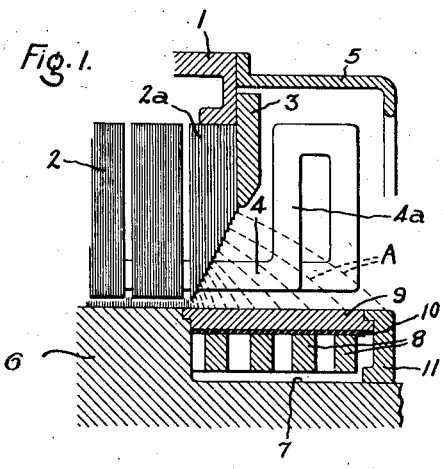
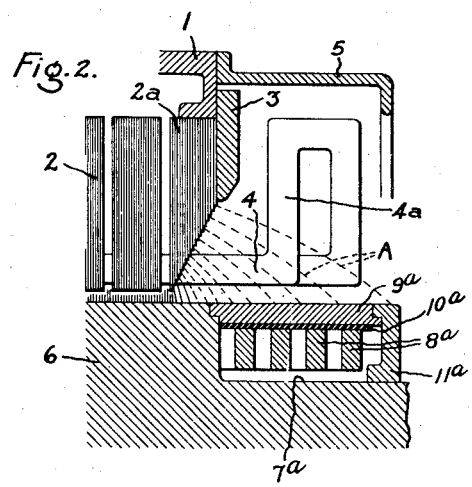
Inventors:
Robert Pohl,
Henry G. Reist;
by *[signature]*
Their Attorney.

Patented Oct. 23, 1928.

1,689,188

UNITED STATES PATENT OFFICE.

ROBERT POHL, OF BERLIN, GERMANY, AND HENRY G. REIST, OF SCHENECTADY, NEW YORK, ASSIGNORS TO GENERAL ELECTRIC COMPANY, A CORPORATION OF NEW YORK.

DYNAMO-ELECTRIC MACHINE.

Application filed March 29, 1927, Serial No. 179,298, and in Germany April 19, 1926.

Our invention relates generally to dynamo-electric machines and has for its object the provision of a magnetic conducting path of low reluctance for the stray field flux produced during the operation thereof so that excessive eddy current losses will be avoided.

The stray field produced in the operation of a dynamo-electric machine moves peripherally of the stator and synchronously with the main field. In order to prevent eddy current losses occasioned by this stray field, in accordance with our invention, the stator laminations of the machine between the clamping members are formed to facilitate the entrance of the stray field flux thereinto in such direction that the resulting eddy currents are minimized.

Our invention will be more fully explained in the following description by referring to the accompanying drawing, in which Fig. 1 is a fragmentary sectional view of the rotor and stator of a dynamo-electric machine embodying our invention; and Fig. 2 is a fragmentary sectional view of a slight modification of the form of our invention shown in Fig. 1.

In Fig. 1 of the drawing the frame of the dynamo-electric machine 1 supports the stator laminations 2 which are clamped in place at each end of the frame by the clamping member 3. The stator windings 4 pass through stator slots and end connections 4ª thereof extend peripherally of the stator and through other stator slots in accordance with the usual construction. A winding guard 5 is attached to the frame 1 to protect the windings and improve the general appearance of the machine. A rotor 6 is mounted with its periphery closely adjacent the stator laminations and is reduced in diameter at 7 to afford a space for the windings 8 of the rotor, which are retained in position and enclosed by means of a ring 9, insulated therefrom at 10, and an end ring 11. In operation of the machine a rotating stray field is produced as above referred to by the windings of the rotor, the conductors 4 and their end connections 4ª which is indicated in dotted lines at A in the drawing. This stray field would ordinarily enter the sides of the stator laminations and induce large eddy currents therein, inasmuch as the cross section of the laminations is large transverse to the path of the stray field flux, but this is prevented in our construction by arranging a group 2ª of stator laminations which are of the same outside diameter as the remainder of the stator laminations and which are arranged between the clamping members 3 adjacent the end of the stator at successively increasing distances from the axis of the rotor, which forms a series of steps steeply inclined to the rotor, as clearly shown in the drawing. For the best results this inclination should be substantial, at least 30 degrees to the axis of the rotor and preferably 45 degrees or more. If desired the edges of the laminations of this group 2ª may be beveled so as to present a smooth surface inclined relative to the rotor. The stator laminations are formed in the usual manner by punching them out of sheets of varnished metal, and the stator may be made up of a plurality of sectors or a plurality of annuli in accordance with the usual practice. It may be found convenient to make the laminations of the group 2ª of successively decreasing inside diameter from the end of the stator longitudinally thereof, or merely to arrange lamination sectors at different distances from the rotor axis, but in either method of construction the edges of the laminations of this group will be exposed to the stray field flux, thereby offering it a path of low reluctance in the stator laminations in which eddy current losses will be comparatively small.

In the modification illustrated in Fig. 2 of the drawing, our invention is applied to a dynamo-electric machine wherein the face of the rotor 6ª carrying the useful flux extends longitudinally thereof adjacent the stepped group of laminations, so that the stepped group of laminations carry part of the useful flux as well as the stray field flux. The rotor 6ª is of similar construction to the rotor 6 and is reduced in diameter at 7ª to afford a space for the windings 8ª. The ring 9ª is insulated at 10ª from the winding 8ª, forming with the ring 11ª and the rotor an enclosure for the ends of the winding. The frame 1 supports the laminations 2 and the stepped group thereof 2ª, which are clamped in the frame 1 of the machine between clamping members 3, which are arranged at the ends of the frame, and the winding guard 5 is employed as in the structure of Fig. 1.

In operation of either of these forms of our invention a stray field flux is produced by the rotor and the windings as indicated by the dotted lines at A. This flux is directed toward the exposed ends of the stepped group of laminations, is distributed throughout them, and passes therethrough radially and circumferentially as the stray field revolves synchronously with the rotor. Thus it will be clear that the stepping of the end group of laminations makes them more effective as a magnetic path for the end stray field flux and since the transverse section of the laminations along the path of the flux being small, eddy current losses will be minimized.

In the arrangement shown in Fig. 1 the active iron of the rotor 6 only extends as far as the group of laminations 2ª of the stator which is inclined to the rotor so that this group of laminations 2ª serves only as a path for the stray flux. In the arrangement shown in Fig. 2, however, the active iron of the rotor 6 extends as far as the end of the inclined group of laminations 2ª of the stator. In this arrangement the group of laminations 2ª in addition to its function as a stray flux return path would also act as active iron.

It will be seen from the foregoing description that our invention materially reduces eddy current losses due to the end stray field flux of a dynamo-electric machine, and we desire it to be understood that our invention is not limited to the particular arrangement shown and described, but we intend in the appended claims to cover all modifications which do not depart from the spirit and scope of our invention.

What we claim as new and desire to secure by Letters Patent of the United States, is,—

1. In a dynamo-electric machine, a stator including laminations transversely aligned to form a surface adapted to substantially conform to a rotor, clamping members for retaining said laminations in said stator, and a group of said laminations between said clamping members and adjacent the end of the stator having their edges at different distances from the axis of the stator in order to reduce eddy current losses due to end stray field flux, said group of laminations being of substantially the same outer diameter as said stator laminations.

2. In a dynamo-electric machine, a rotor, a stator including laminations forming a surface substantially conforming to the shape of the rotor, clamping members for retaining said laminations in the stator, and a group of said stator laminations between said clamping members and adjacent the end of the stator in which the laminations are at successively increasing distances from the axis of the rotor, thereby exposing the laminations of the group to the end stray field flux in order to reduce eddy current losses therein, said group of laminations being of substantially the same outer diameter as said stator laminations.

3. In a dynamo-electric machine, a rotor, a stator including laminations forming a surface substantially conforming to the shape of the rotor, clamping members for retaining said laminations in the stator, and a group of said stator laminations between said clamping members and adjacent the end of the stator successively decreasing in diameter from the end of the stator longitudinally thereof, thereby forming a steep incline relative to the axis of said rotor in order to reduce the losses due to the end stray field flux, said group of laminations being of substantially the same outer diameter as said stator laminations.

4. In a dynamo-electric machine, a rotor, a stator including laminations forming a surface substantially conforming to the shape of the rotor, clamping members for supporting said laminations in said stator and a group of said stator laminations between said clamping members and adjacent the end of the stator successively decreasing in diameter from the end of the stator longitudinally thereof, the successive decrease in diameter of the laminations of said group being such as to form an incline of at least 30 degrees relative to the axis of said rotor in order to reduce losses due to the end stray field flux, said group of laminations being of substantially the same outer diameter as said stator laminations.

5. In a dynamo-electric machine, a rotor, and a stator including laminations that form a surface substantially conforming to the shape of the rotor, clamping members for supporting said laminations in said stator, and a group of said stator laminations between said clamping members and adjacent the end of the stator successively decreasing in diameter in steps from the end of the stator longitudinally thereof, thereby forming a substantial radially stepped incline relative to said rotor in order to reduce the losses due to the end stray field flux, said group of laminations being of substantially the same outer diameter as said stator laminations.

6. In a dynamo-electric machine, a rotor, and a stator including laminations forming a surface substantially conforming to the shape of the rotor, clamping members for supporting said laminations in said stator, and a group of said stator laminations between said clamping members, and adjacent the end of the stator successively decreasing in diameter from the end of the stator longitudinally thereof, thereby forming a radial incline relative to said rotor, said rotor extending longitudinally beyond said stator, said group of laminations being of substantially the same outer diameter as said stator laminations.

In witness whereof, we have hereunto respectively set our hands the 23rd day of February, 1927, and the 28th day of March, 1927.

ROBERT POHL.
HENRY G. REIST.